United States Patent Office 3,441,631
Patented Apr. 29, 1969

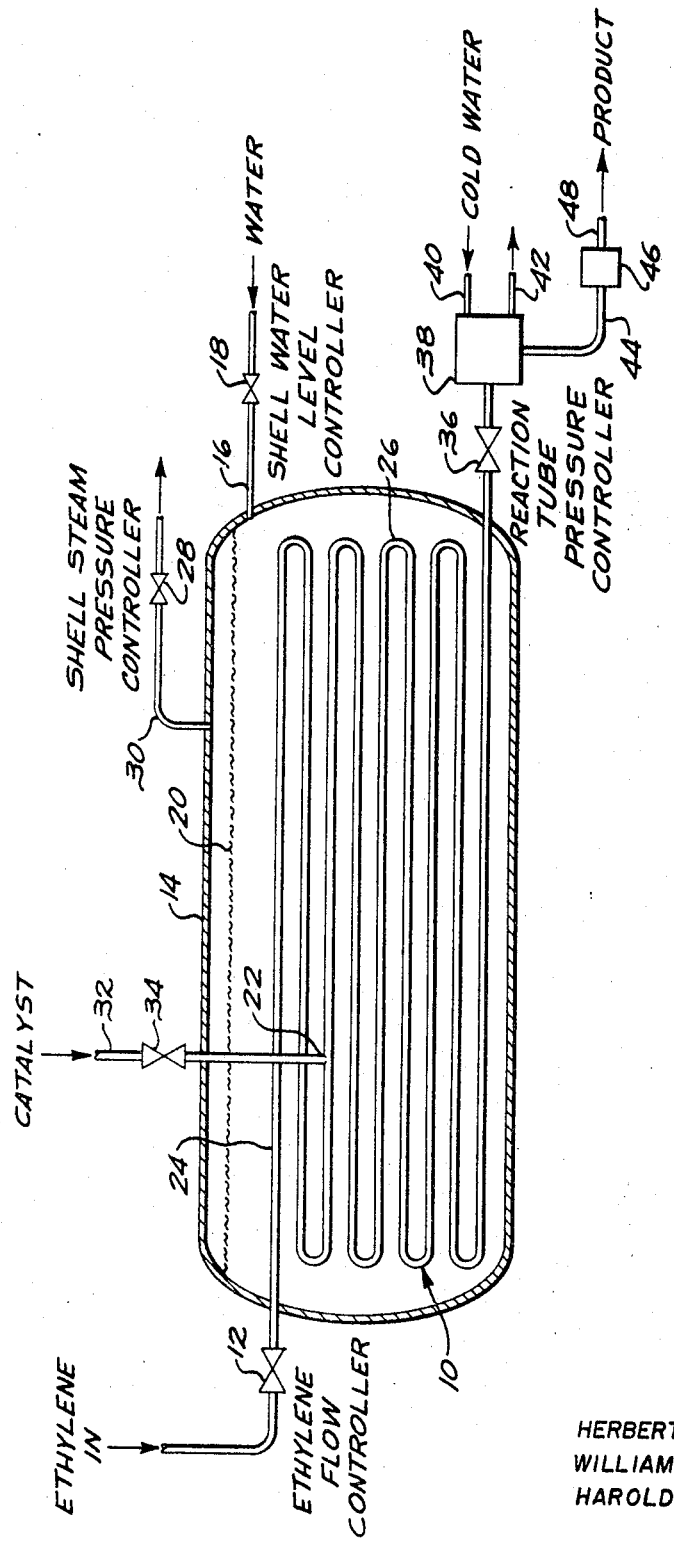

3,441,631
METHOD FOR CONVERTING ETHYLENE TO ALPHA-OLEFINS IN THE PRESENCE OF PHENOTHIAZINE
Herbert B. Fernald and William Gall, Glenshaw, and Harold E. Swift, Gibsonia, Pa., assignors to Gulf Research & Development Company, Pittsburgh, Pa., a corporation of Delaware
Filed Nov. 9, 1966, Ser. No. 593,155
Int. Cl. C07c 3/10
U.S. Cl. 260—683.15      1 Claim

ABSTRACT OF THE DISCLOSURE

Solid polymer formation in the triethylaluminum catalyzed conversion of ethylene to linear alpha-olefins is reduced by the addition of various organic inhibitors. The presence of phenothiazine during the reaction inhibits polymer formation without any substantial adverse effect upon the efficiency of the process.

---

This invention relates to a method for reducing solid polymer formation in a process for the conversion of ethylene to liquid alpha-olefins by performing said process in the presence of phenothiazine or a derivative thereof.

In a process for the conversion of ethylene primarily to liquid normal alpha-olefins having from about 4 to 30 or 40 carbon atoms in the presence of an organometallic catalyst, such as triethylaluminum, a small but highly deleterious quantity of solid polyethylene polymer is formed which deposits on reactor surfaces, interfering with heat transfer and necessitating frequent shutdowns of the reactor for removal of said polymer. In accordance with the present invention we have found that the presence of phenothiazine during the reaction inhibits formation of said polymer without any substantial adverse effect upon the efficiency of the process. Any amount of phenothiazine which inhibits polymer formation can be employed. For example, the concentration of phenothiazine in the charge can be between about 0.25 and 500 parts per million, generally, and between about 2 and 100 parts per million, preferably.

The stepwise conversion of gaseous ethylene to higher straight chain normally liquid olefins having the double bond in the terminal or alpha position proceeds as follows:

$$CH_2=CH_2 + CH_2=CH_2 \rightarrow CH_3-CH_2-CH=CH_2$$
$$CH_3-CH_2-CH=CH_2 + CH_2=CH_2 \rightarrow$$
$$CH_3-CH_2-CH_2-CH_2-CH=CH_2$$

etc. This polymerization occurs catalytically in the presence of organometallic compounds, such as aluminum alkyls, which participate in the reaction. As the reaction proceeds in the presence of excess ethylene, an increasing quantity of gaseous ethylene is converted to liquid olefin so that the density of the reaction system progressively increases. The chemistry of the alpha-olefin process can be described in terms of three major reactions. In the propagation (growth) reaction, an alkyl group on an aluminum atom containing $n$ ethylene units can add an ethylene molecule to become an alkyl group of $n+1$ ethylene units, as follows:

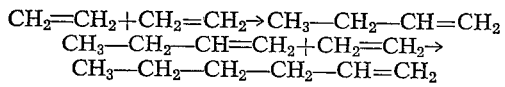

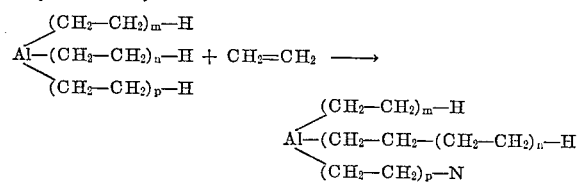

The transalkylation (displacement) reaction which occurs concurrently with the growth reaction consists of two steps. These are, first, thermal decomposition of an aluminum alkyl group to a hydride plus alpha-olefin followed by a rapid reaction of the hydride with ethylene to regenerate an ethyl group which can start another growth cycle. The thermal decomposition is much slower than reaction of ethylene with a hydride and, therefore, is the rate-determining step for the overall reaction.

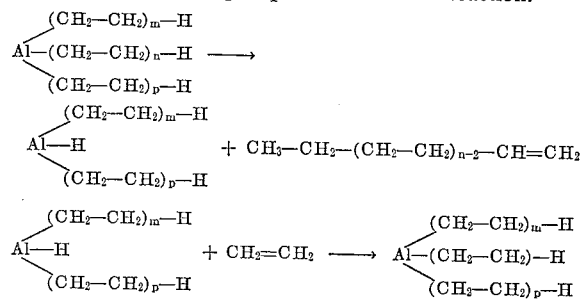

The growth and displacement reactions occur repeatedly as long as there is unreacted ethylene present. Therefore, the reaction is advantageously afforded a very high residence time. As long as there is free ethylene in the presence of catalyst in the reactor under reaction conditions, each mole of catalyst present will produce additional normal alpha-olefin product. Therefore, a long residence time is conducive to a high alpha-olefin yield per mole of catalyst, i.e., a high catalyst efficiency.

The third reaction is similar to the first except that the aluminum alkyl adds a product alpha-olefin, rather than ethylene, to form a branched chain aluminum alkyl group. However, this structure is very unstable and rapidly decomposes to form a hydride and an olefin of vinylidene structure.

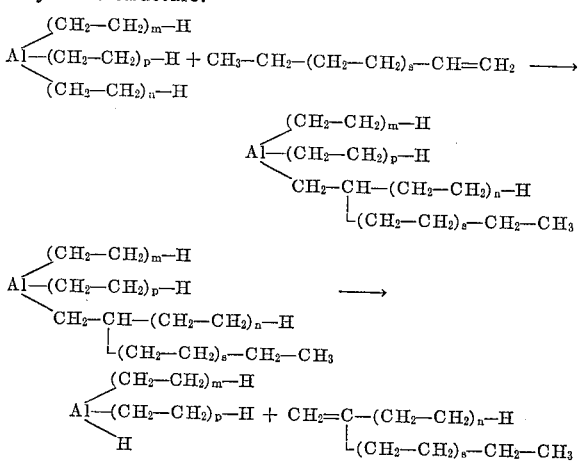

The decomposition is so rapid compared to the addition of another ethylene molecule to the branched alkyl that essentially all reactions of this type result in an olefin of vinylidene structure and regeneration of an aluminum ethyl group. As a result, there will be few, if any, alpha olefins with branching beyond the beta-carbon.

Low temperature favors the growth reaction and will result in a higher average molecular weight product. At high temperatures, the average molecular weight will be lower because the transalkylation reaction predominates. The proportion of $C_{12}$ alpha-olefin in the product tends to remain relatively constant with temperature changes within the most preferred range of this invention, with lower temperatures favoring a relatively higher proportion of product above $C_{12}$ and higher temperatures favoring a relatively higher proportion of product below $C_{12}$.

It is believed that the higher molecular weight alpha-olefins produced at temperatures below reaction temperatures may be precursors to the solid polymers which it is the purpose of the present invention to inhibit. Therefore, in performing the process of the present invention cold ethylene charge is preheated substantially to full reaction temperature, i.e., to within about 5° F. or 10° F. of reaction temperature, prior to addition of catalyst thereto and commencement of the reaction. For example, when the reaction is performed continuously in a tubular reactor surrounded by a heat exchange medium, cold ethylene is charged to the inlet end of the tube and permitted to become preheated. The catalyst is injected into the tube at the downstream position therein at which ethylene has substantially reached full reaction temperature. In this manner, production of relatively high molecular weight alpha-olefins is avoided.

In view of the fact that the production of normal alpha-olefins is the object of the above reactions, ethylene is the sole olefin which can be employed in the charge. The normal alpha-olefins produced will have from four to about 40 carbon atoms and will be primarily liquid with practically the only solid polymer produced being an undesired byproduct which is inhibited in accordance with the method of the present invention. The normal alpha-olefins produced, particularly the $C_{12}$, $C_{14}$ and $C_{16}$ alpha-olefins, have high utility for the production of detergents.

The catalyst employed in the alpha-olefin process can be defined by the following structural formula:

$$M'_aM_bR_cX_d$$

wherein M' is a metal selected from the alkali or alkaline earth metals and $a$ can be either 0 or 1; M is a metal selected from the group consisting of aluminum, gallium, indium and beryllium and $b$ can be either 0, 1 or 2, except that $a+b$ is at least 1; R is selected from the group consisting of monovalent saturated aliphatic or alicyclic radicals, monovalent aromatic radicals or any combination thereof; X is selected from the group consisting of hydrogen and halogen. The sum of $c$ and $d$ is equal to the total valences represented by the metals, and when X is a halogen $c$ must be at least 1. Examples of catalysts which can be employed includes $Be(C_2H_5)_2$, $LiC_2H_5$, $AlH_3$, $HAl(CH_3)_2$, $Al(CH_3)_3$, $Al(C_2H_5)_3$, $Al(C_4H_9)_3$
$Al(C_3H_7)_3$, $Al(C_6H_5)_3$, $Ga(CH_3)_3$, $Ga(C_2H_5)_3$
$In(C_2H_5)_3$, $In(CH_3)_3$, $Be(C_6H_5)_2$, $Na(C_5H_{11})$
$Al(C_2H_5)_2Cl$, $Al(C_2H_5)Cl_2$, $Al(C_4H_9)_{1.5}Cl_{1.5}$
$Al(C_4H_9)_2Cl$, $LiAlH_4$, $NaAlH_4$, $LiAl(C_2H_5)_4$ $NaAl(C_4H_9)_4$, $Mg(AlH_4)_2$, $Zn(C_2H_5)_2$, etc. The catalyst can be used as such, but preferably is employed with about 70 to about 98 percent by weight thereof of an inert hydrocarbon solvent such as saturated aliphatics (n-pentane, isopentane, hexane, n-heptane, isooctane, n-dodecane, merusol oil, paraffinic oils, kerosene, etc.), alicyclics such as cyclohexane, cyclopentane, etc., aromatics such as benzene, toluene, etc. Since it is desired to produce a liquid alpha-olefin product rather than a relatively high molecular weight solid polymer, the catalyst should be substantially free of catalyst components other than the catalysts defined above, such as, for example, $TiCl_4$, which tend to cause production of relatively high molecular weight solid polymers. The amount of catalyst required herein is not critical and can be from about $1\times10^{-4}$ to about $1\times10^{-2}$ moles per mole of ethylene.

The temperature of the reaction can range from about 285° F. to about 615° F., generally, from about 350° F. to about 430° F., preferably, and from about 380° F. to about 400° F., most preferably. The upper range of pressure employed is not critical and can be as high as about 1000 atmospheres or even higher, but the lower pressure range, however, is critical. The pressure should be sufficiently high that most of the alpha-olefin product is a liquid under reaction conditions and so that the catalyst and most of the ethylene are dissolved or dispersed in said liquid. As soon as liquid alpha-olefin product is produced, the catalyst tends to entirely dissolve therein. It is important to have as high as possible a concentration of ethylene in the phase containing the catalyst, otherwise liquid olefin product rather than ethylene will tend to react with the catalyst to produce vinylidenes. Therefore, the pressure should be sufficiently high to force as much ethylene as possible into the liquid phase together with the catalyst. After there has been a conversion of 55 to 60 percent of the ethylene, there is sufficient liquid product to dissolve substantially all the ethylene and produce a single homogeneous phase in the reactor. Thus, the pressure in the reactor must at all times be at least about 500 or 1000, and preferably at least about 2000 pounds per square inch gauge.

When it is desired to terminate the reaction, the product is withdrawn from the tubular reactor and is reduced in temperature and pressure, whereupon most of the gaseous olefins are flashed off. The liquid product is then treated in any suitable manner to deactivate the catalyst and the desired product fractions are recovered. The catalyst may be deactivated, for example, by contact with sufficient acid, base, water or alcohol to react stoichiometrically with the catalyst. When an acid or base is employed an aqueous layer is formed, which is then separated from the organic layer, and the remainder, including the solvent for the catalyst, can be separated into its component parts by distillation. If desired, the catalyst can be deactivated by contact with oxygen or halogens or any other material which reacts with and suitably destroys the catalytic activity of oragnometallic compounds. In a preferred method the aluminum catalyst is removed from the alpha-olefin product by reaction with caustic solution to form $Na_2OAl_2O_3$ plus paraffin as follows:

$$2H_2O + 2NaOH + 2AlR_3 \rightarrow Na_2OAl_2O_3 + 6 \text{ paraffin}$$

It is shown in Ser. No. 153,815, filed Nov. 21, 1961, now abandoned, that the amount of the desired normal alpha-olefin in the product is always greater when the polymerization reaction is carried out in a tubular or coil reactor rather than in a single continuous stirred autoclave or series of stirred autoclaves for a given total conversion of ethylene to some kind of polymer. That application explains that in order to achieve high selectivity toward normal alpha-olefins the reactants and product should flow substantially as a column through the tube whereby there is a minimum of backmixing so that the percentage of normal alpha-olefin product increases throughout the length of the reactor. Since a given molecule of aluminum alkyl catalyst can undergo growth and transalkylation reactions repeatedly, it is important that ethylene charge and catalyst be permitted a high residence time in order to achieve a high catalyst efficiency, i.e., the production of a large amount of normal alpha-olefins per mole of aluminum alkyl catalyst charged. A high residence time and avoidance of backmixing is most conveniently achieved by utilizing a very long tubular reactor.

EXAMPLE 1

A series of tests were conducted to determine the polymer inhibiting effect of phenothiazine and other materials in an alpha-olefin process. The effect of the production of even a small amount of polymer in an alpha-olefin process is very great in terms of tube fouling, causing interference with heat transfer and requiring periodic reactor shutdowns in order to clean the tubes. These disadvantages effects occur even though the amount of ethylene converted to polymer is an extremely small fraction of the amount of ethylene converted to the desired olefins. Therefore, if tests were to be performed under conventional operating conditions, the test period would have to be extensive in order for sufficient polymer to be produced in relation to alpha-olefin yield to render the measurements reliable. Furthermore, tests which extend over an unduly long period would consume relatively large amounts of ethylene and catalyst before a reliable measurement could be obtained.

Therefore, a test procedure was devised to accelerate the production of polymer and provide an indication of the effectiveness of phenothiazine and other materials upon polymer inhibition. These tests employed the phenothiazine and other materials under polymer producing conditions much more severe than those ordinarily encountered in an alpha-olefin process in which the phenothiazine of this invention is adapted to be utilized.

The test procedure was devised on the theory that polymerization in an alpha-olefin reactor is encouraged because of formation of a cocatalyst in the system by reaction between triethylaluminum and metal oxides on oxidized reactor metal surfaces, such as, for example, oxides of molybdenum, nickel, iron, chromium, copper, aluminum, etc., followed by reaction of ethylene with said cocatalyst to produce said polymer. These cocatalysts do not tend to form with metals in nonoxidized reactor tubes, such as reactor tubes which have been freshly acid washed. Based upon this theory, a number of metal oxides were tested together with triethylaluminum as catalysts for solid polyethylene formation. One of the best combinations tested for encouragement of polymer formation was a commercial colloidal aluminum oxide and triethylaluminum. Therefore, this combination was utilized in the tests described below.

In the tests, 3.0 grams of the commercial colloidal aluminum oxide plus about 10 grams (6.0 weight percent) of triethylaluminum in a cyclohexane solvent was charged to a one-gallon autoclave equipped with a stirrer, a bottom outlet line, inlet lines for adding ethylene, a thermowell for a thermocouple to measure temperature, and an outlet for a pressure gauge. Some ethylene was charged to the autoclave and then the temperature was brought to full reaction temperature of 392° F. The pressure was then brought to 500 pounds per square inch gauge by the addition of ethylene. As ethylene was converted either to polyethylene or to alpha-olefins fresh ethylene was added so that the pressure of 500 pounds per square inch gauge was maintained throughout the reaction period. The reaction was allowed to proceed for 8 hours at which time the product was discharged through a filter for collection of the polymer. The amount of ethylene reacted was determined by the difference in the amount of ethylene metered into the autoclave and the amount of ethylene discharged at the end of the test period. The autoclave was disassembled and all the polymer on inside autoclave surfaces was collected and processed with the polymer from the filter to remove solvent and product olefins in order to determine the weight of dry polyethylene produced in the test. The polyethylene produced was expressed as parts per million based on the total ethylene reacted.

The effectiveness of phenothiazine as a polymer inhibitor was determined by comparing the results obtained by incorporating phenothiazine in the cyclohexane solvent with the results obtained in a similar test except that no polymer inhibitor was present in the cyclohexane solvent. Tests were also performed to compare the effectiveness of phenothiazine in the cyclohexane solvent against the use of a cyclohexane solvent to which had been added various other compounds containing sulfur and/or nitrogen. Furthermore, tests were performed to show the effectiveness of a hydrogenated sulfur- and nitrogen-containing lubricating oil derived from a natural crude in a cyclohexane solvent as a polymer inhibitor. A full description of the lubricating oil is presented in Example 2 of Ser. No. 593,214, filed Nov. 9, 1966.

The results of the tests performed in accordance with the above test description are presented in Table 1, below.

TABLE 1

| Test | Inhibitor | Amount | Polymer produced, p.p.m. based on total ethylene reacted | Catalyst efficiency, grams ethylene converted per gram of triethyl aluminum |
|---|---|---|---|---|
| 1 | Cyclohexane used as a catalyst solvent with no inhibitor present. | | 2,000–2,500 | 110–120. |
| *Materials Which Significantly Reduce Polymer Production* | | | | |
| 2 | Sulfur and nitrogen-containing hydrogenated lubricating oil derived from a natural crude. | 20 ml | 325 | 126. |
| 3 | do | 40 ml | 49 | 133. |
| 4 | Phenothiazine | 0.25 gm | 231 | 89. |
| 5 | Same as Test 4 above | 0.5 gm | 282 | 109. |
| 6 | 2-mercaptobenzothiazole | 0.1 gm | 91 | 109. |
| 7 | Diphenyl amine | 0.2 gm | 526 | 162. |
| 8 | Dodecyl sulfide $C_{12}H_{25}$—S—$C_{12}H_{25}$ | 10 gm | 289 | 129. |
| *Materials Which Reduce Polymer Production But Which Also Severely Reduce Catalyst Efficiency* | | | | |
| 9 | 4,4'-methylene bis 2,6 ditertiary butyl phenol | 0.1 gm | 852 | 68. |
| 10 | Phenothiazine (formula above) plus 4,4'-methylene bis 2,6 ditertiary butyl phenol. | 0.5 gm. each | 1,200 | 26. |
| 11 | Quinoline | 0.2 gm | 2,360 | 50. |
| 12 | Benzyl disulfide | 0.2 gm | 433 | 67. |

| Test | Inhibitor | Amount | Polymer produced, p.p.m. based on total ethylene reacted | Catalyst efficiency, grams ethylene converted per gram of triethyl aluminum |
|---|---|---|---|---|
| Materials Which Reduce Polymer Production But Which Also Severely Reduce Catalyst Efficiency ||||| 
| 13 | Thiobenzanilide | 0.2 gm | 673 | 91. |
| 14 | Diethyl aniline | 0.2 gm | 815 | 36. |
| 15 | Thiobarbituric acid | 0.2 gm | 1,020 | 41. |
| Materials Which Deactivate the Catalyst Completely ||||| 
| 16 | Thioacetamide | 0.2 gm | No reaction. | |
| 17 | Thianthrene | 0.2 gm | Do. | |
| 18 | Benzoquinone | 0.2 gm | Do. | |
| 19 | 2,4,6-trimethyl pyridine | 0.2 gm | Do. | |
| 20 | Styrene | 0.2 gm | Do. | |
| 21 | Thiourea | 0.2 gm | Do. | |
| 22 | Diphenyl ether | 0.2 gm | Do. | |
| 23 | Dibutyl p-cresol | 0.2 gm | Do. | |
| 24 | Thiophene | 0.2 gm | Do. | |

Table 1 shows that phenothiazine is highly effective in inhibiting polymer production while presenting no significantly adverse effect upon catalyst efficiency in a alpha-olefin process.

The accompanying drawing shows a single tubular reactor system wherein ethylene is charged to a very long tubular reactor 10 through a flow control valve 12. Tubular reactor 10 is disposed substantially entirely within outer shell 14. Cooling water is charged to shell 14 through line 16. Level control valve 118 maintains a constant water level 20 within the shell which completely submerges reactor 10. A relatively small stream of triethylaluminum catalyst, together with phenothiazine dissolved in a suitable solvent is pumped by positive displacement action to an intermediate point 22 in coil 10 through line 32 and valve 34 so that the region 24 of said coil upstream from point 22 serves as an ethylene preheat zone and the region 26 of said coil downstream from point 22 serves as a reaction zone. Point 22 is essentially the point in said reactor coil closest to the inlet end wherein the ethylene is substantially effectively preheated to the reaction temperature. Thereafter, regulation of steam pressure within shell 14 by means of steam pressure control valve 28 in line 30 establishes the temperature of the boiling water throughout shell 14 and maintains a uniform reactor temperature substantially throughout the length of reaction zone 26 of the coil 10. Reaction zone effluent comprising predominantly normal alpha-olefins, unreacted ethylene, and catalyst is discharged through reactor pressure control valve 36, whereat the pressure is reduced to between about 50 and 1,000 pounds per square inch gauge, and is then discharged through cooling chamber 38 whereat product temperature is reduced to the lowest practical temperature while still maintaining the product in a liquid state, i.e., to about 150° F., by means of water charged through line 40 and removed through line 42. Finally, product which is cooled and at a reduced pressure is passed through line 44 and a product measuring device 46, such as a flow recorder or chromatograph, and is then discharged through line 48 to a caustic treatment chamber, not shown, for removing the catalyst from the desired normal alpha-olefin product by reacting the catalyst with caustic to produce sodium aluminate and paraffins.

In order to achieve the highest conversion of ethylene to normal alpha-olefin per mole of catalyst used, the length of the reactor is made as long as possible and is only limited by practical and economic size restrictions of outer shell 14, and by pressure drop. For example, tube 10 can comprise between about 500 and 10,000 feet of about one- to four-inch pipe. There are a number of reasons for utilizing a very long tubular reactor. First, a very long tubular reactor permits excellent heat transfer for removal of heat of reaction. Secondly, it advantageously reduces backmixing for the reason explained above. Thirdly, a long reactor length permits achievement of a high catalyst efficiency because of the additional conversion per mole of catalyst. Finally, a long reactor length tends to minimize the percentage of paraffin in the alpha-olefin product. The final reason is based upon the fact that upon separation of the alkyl aluminum catalyst by treatment with caustic the alkyl components of the catalyst are converted to paraffins which have boiling points close o those of the most desired alpha-olefin components of the product and are therefore difficult to remove from the desired normal alpha-olefins. Since the absolute amount of paraffins produced is fixed by the quantity of catalyst used, the greater the quantity of alpha-olefins produced with said catalyst the smaller will be the percentage of paraffins in the product.

The steam pressure in shell 14 is maintained at about between 50 and 500 pounds per square inch, generally, and at about between 140 and 340 pounds per square inch, preferably. The reactants in reaction zone 26 are generally at a temperature only about 3° F. to 15° F. above the bath temperature. As noted above, the reaction temperature not only affects the degree of conversion of ethylene but, more importantly, it also establishes the molecular weight distribution of the alpha-olefin product. Since relatively low reaction temperatures favor conversion to relatively high molecular weight product it is important to preheat the ethylene to within about 1° F. to 10° F., generally, and 3° F. to 6° F., preferably, of the coolant bath temperature prior to catalyst addition. It is believed that the relatively high molecular weigh alpha-olefins produced at low reaction temperatures grow into polymers which can foul the downstream region of the reactor tube and thereby increase the frequency of periodic reactor down times due to fouling because of polymer formation. For this reason, it is important not to add catalyst to the reactor tube until the ethylene has been preheated to as near as possible to reaction temperature, and a least to within about 10° F. of reaction temperature.

Finally, the reactor tube should not be so long that more than about 75 weight percent, generally, or more than about 60 weight percent, preferably, of the ethylene is converted to product. The reason is that at high conversion levels, there arises excessive competition between olefin product and ethylene in the growth reaction, whereby conversion to vinylidene compounds becomes excessive.

The pressure in the tubular reactor should be sufficiently high that the alpha-olefin product is mostly liquid phase under reaction conditions and the ethylene and catalyst is presumably dissolved or dispersed in said liquid. Therefore, the pressure in the reactor tube should be at least about 500 or 1000 pounds per square inch gauge. The pressure drop through the tube is between about 5 and 300 pounds per square inch.

Any derivative of phenothiazine which is effective for inhibiting polymer formation can be used in the process of this invention. For example, phenothiazine derivatives having an alkyl group containing between about one and eighteen carbon atoms at one or more positions in the benzene rings can be employed. Other phenothiazine derivatives include phenothiazines having hydrogen, alkaryl or arylalkyl substituents attached to one or more positions on the benzene rings and phenothiazines having an alkyl, aryl, alkylaryl or arylalkyl substituent attached to the nitrogen atom.

Various changes and modifications can be made without departing from the spirit of this invention or the scope thereof as defined in the following claim.

We claim:
1. A process for producing liquid alpha-olefins containing primarily between about 4 and 40 carbon atoms comprising charging ethylene through a metallic tubular reactor having metal oxides on oxidized reactor metal surfaces, said reactor being immersed in a bath of pressurized water with the inlet end of said tubular reactor being a preheat zone and the reaction zone beginning at an intermediate position in said tubular reactor, preheating said ethylene in said preheat zone to within about 10° F. of reaction temperature, charging triethylaluminum which is substantially free of TiCl$_4$ or other components tending to cause production of solid polymers to the preheated ethylene at said intermediate position in the tubular reactor, charging between about 0.25 and 500 parts per million of phenothiazine to said tubular reactor, maintaining said tubular reactor at a reaction temperature between abou 285° F. and 615° F. and a pressure of at least about 1,000 pounds per square inch, and withdrawing an effluent stream containing said alpha-olefins from said tubular reactor.

References Cited

UNITED STATES PATENTS 3,310,600  3/1967  Ziegler et al.
3,318,858  5/1967  Nakaguchi et al. ____ 260—93.7

PAUL M. COUGHLAN, JR., *Primary Examiner.*